United States Patent
Teague et al.

(10) Patent No.: US 11,543,520 B2
(45) Date of Patent: Jan. 3, 2023

(54) AIRCRAFT SYSTEM AND METHOD TO DISPLAY THREE-DIMENSIONAL THREAT IMAGE

(71) Applicant: Rockwell Collins, Inc., Cedar Rapids, IA (US)

(72) Inventors: Jacob Teague, West Melbourne, FL (US); Venkata Sishtla, Cedar Rapids, IA (US); Divesh Lakhi, Cedar Rapids, IA (US); Mark Fersdahl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 220 days.

(21) Appl. No.: 16/943,847

(22) Filed: Jul. 30, 2020

(65) Prior Publication Data
US 2022/0035025 A1 Feb. 3, 2022

(51) Int. Cl.
*G06T 15/00* (2011.01)
*G01S 13/95* (2006.01)
(Continued)

(52) U.S. Cl.
CPC ............ *G01S 13/953* (2013.01); *G01S 13/89* (2013.01); *G06F 3/14* (2013.01); *G06T 15/00* (2013.01)

(58) Field of Classification Search
CPC .......... G06F 3/14; G06F 3/147; G06F 16/909; G06F 15/00; G06F 16/50; G06T 15/00;
(Continued)

(56) References Cited

U.S. PATENT DOCUMENTS

| 5,198,819 A | 3/1993 | Susnjara |
| 7,205,928 B1 | 4/2007 | Sweet |

(Continued)

FOREIGN PATENT DOCUMENTS

| EP | 3296697 A1 | 3/2018 |
| FR | 2944596 B1 | 6/2011 |

OTHER PUBLICATIONS

Extended Search Report for European Application No. 21188737.7 dated Dec. 10, 2021, 8 pages.

*Primary Examiner* — Hau H Nguyen
(74) *Attorney, Agent, or Firm* — Suiter Swantz pc llo

(57) ABSTRACT

A system may include at least one display and at least one processor installed in an aircraft. The at least one processor may be communicatively coupled to the at least one display. The at least one processor may be configured to: obtain aircraft data associated with the aircraft; obtain an azimuth value associated with an azimuth; obtain radar data associated with at least one threat; generate a three-dimensional threat image based at least on the aircraft data, the azimuth value, and the radar data; and output the three-dimensional threat image as graphical data. The at least one display may be configured to display the three-dimensional threat image to a user. The three-dimensional threat image may depict a three-dimensional relationship between the aircraft and the at least one threat. The three-dimensional threat image may convey a range dimension, a lateral dimension extended perpendicularly from the azimuth, and a height dimension.

12 Claims, 7 Drawing Sheets

(51) Int. Cl.
*G01S 13/89* (2006.01)
*G06F 3/14* (2006.01)

(58) Field of Classification Search
CPC ....... G06T 19/003; G06T 19/20; G06T 19/00; G01S 13/72; G01S 19/00
See application file for complete search history.

(56) References Cited

U.S. PATENT DOCUMENTS

| | | |
|---|---|---|
| 7,688,254 B2 | 3/2010 | Khatwa |
| 8,095,314 B2 | 1/2012 | Wilson |
| 8,111,186 B2 | 2/2012 | Bunch et al. |
| 8,681,021 B1 | 3/2014 | Carrico |
| 9,057,773 B1 | 6/2015 | Fersdahl et al. |
| 9,710,218 B2 | 7/2017 | Khatwa et al. |
| 9,823,347 B1 | 11/2017 | Koenigs et al. |
| 10,037,124 B2 | 7/2018 | Khatwa et al. |
| 10,175,388 B2 | 1/2019 | Stulken et al. |
| 10,247,821 B1 | 4/2019 | Stover et al. |
| 10,302,815 B1 | 5/2019 | Kronfeld et al. |
| 10,495,783 B2 | 12/2019 | Khatwa et al. |
| 10,580,312 B2 | 3/2020 | Hampel et al. |
| 10,605,912 B1 | 3/2020 | Godfrey et al. |
| 2019/0114931 A1 | 4/2019 | Villele et al. |
| 2020/0033185 A1 | 1/2020 | Suddreth et al. |
| 2020/0082731 A1* | 3/2020 | Choi .................... G08G 5/0086 |
| 2020/0173809 A1 | 6/2020 | Turner et al. |

* cited by examiner

AIRCRAFT SYSTEM AND METHOD TO DISPLAY THREE-DIMENSIONAL THREAT IMAGE

BACKGROUND

Current implementations of a vertical weather display only show the vertical profile along a single azimuth. In order to obtain additional weather information along the selected azimuth, continual control panel adjustments are required of the pilot. The vertical display is also limited in range compared to the horizontal display, requiring constant "switching" between displays.

SUMMARY

In one aspect, embodiments of the inventive concepts disclosed herein are directed to a system. The system may include at least one display and at least one processor installed in an aircraft. The at least one processor may be communicatively coupled to the at least one display. The at least one processor may be configured to: obtain aircraft data associated with the aircraft; obtain an azimuth value associated with an azimuth; obtain radar data associated with at least one threat; generate a three-dimensional threat image based at least on the aircraft data, the azimuth value, and the radar data; and output the three-dimensional threat image as graphical data. The at least one display may be configured to display the three-dimensional threat image to a user. The three-dimensional threat image may depict a three-dimensional relationship between the aircraft and the at least one threat. The three-dimensional threat image may convey a range dimension, a lateral dimension extended perpendicularly from the azimuth, and a height dimension.

In a further aspect, embodiments of the inventive concepts disclosed herein are directed to a method. The method may include: obtaining, by at least one processor installed in an aircraft and communicatively coupled to at least one display installed in the aircraft, aircraft data associated with the aircraft; obtaining, by the at least one processor, an azimuth value associated with an azimuth; obtaining, by the at least one processor, radar data associated with at least one threat; generating, by the at least one processor, a three-dimensional threat image based at least on the aircraft data, the azimuth value, and the radar data; outputting, by the at least one processor, the three-dimensional threat image as graphical data; and displaying, by the at least one display, the three-dimensional threat image to a user; wherein the three-dimensional threat image depicts a three-dimensional relationship between the aircraft and the at least one threat, wherein the three-dimensional threat image conveys a range dimension, a lateral dimension extended perpendicularly from the azimuth, and a height dimension.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
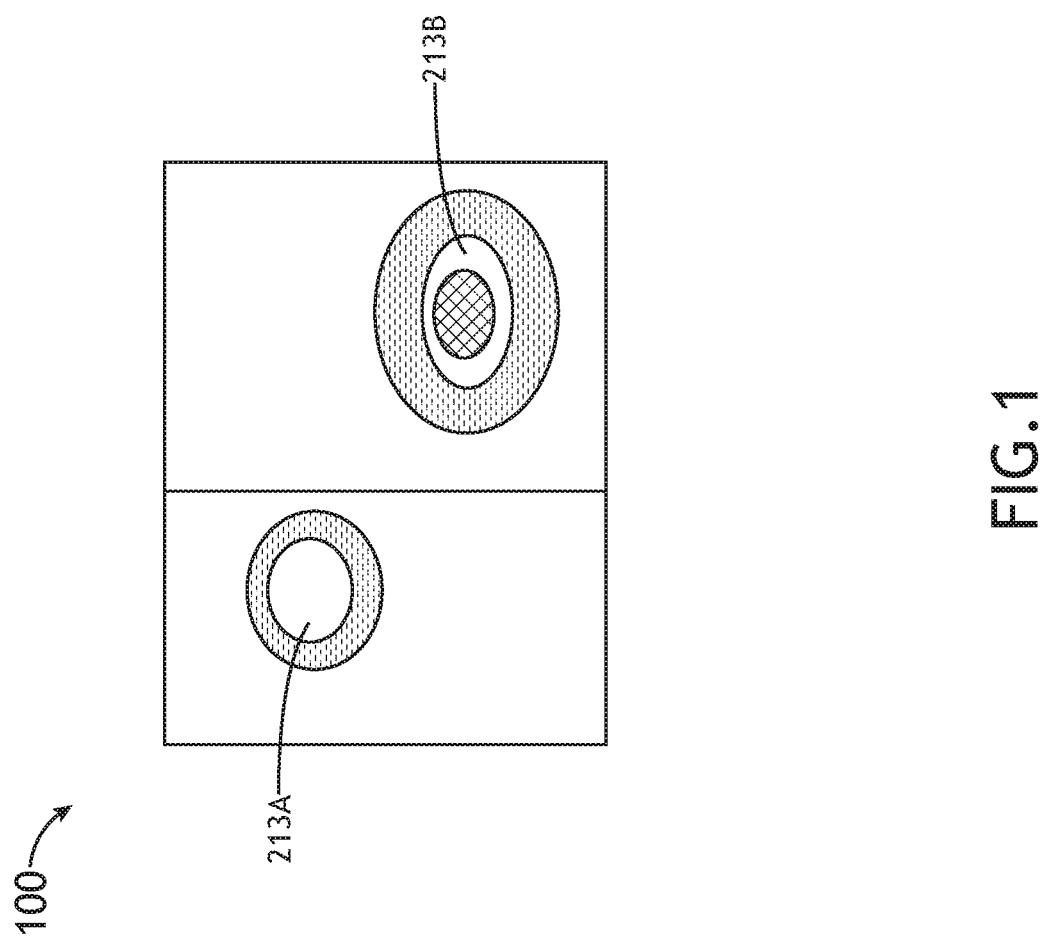
FIG. 1 is a view of an exemplary embodiment of a horizontal two-dimensional threat image according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system (e.g., an aircraft system) and a method configured to display at least one three-dimensional threat image. In some embodiments, the three-dimensional threat image may be a three-dimensional weather threat image. In some embodiments, the three-dimensional threat image may be a three-dimensional comprehensive airborne threat display image.

Some embodiments may provide a way to display all relevant threats at a glance without increasing pilot workload.

Some embodiments may provide a comprehensive display image capable of correlating all relevant horizontal and vertical information. This image may show relevant threats not just along the azimuth of interest but along a lateral area on either or both sides of the azimuth. For example, for a single pilot operation, this method can easily be integrated into threat objects. For normal operation, this method can give the flight crew more situational awareness in case they need to make a quick deviation decision. For example, the displayed image may include simplified depictions of threats to reduce processor processing requirements; for example, threats may be simplified into a horizontal two-dimensional planar portion (e.g., at a base of the threat) and a vertical two-dimensional planar portion extending perpendicularly from the horizontal two-dimensional planar portion. For example, the displayed image may be created by aligning a horizontal image along an azimuth (e.g., a selected azimuth) and by creating vertical image cutouts aligned to highest storm top portions of storm cores. For example, threats may be displayed as a horizontal footprint of the threat at a low altitude and a dome-shaped cross-section extending from the footprint to a peak of the threat. An aircraft intercept altitude indicator may also be shown on each cutout to show the aircraft altitude at a time that the aircraft would be expected to intercept the storm.

Some embodiments may provide significant cost savings and improve aircraft operating safety. For example, upgrading display systems in a cockpit can cost millions of dollars. Some embodiments may provide a way to show all relevant information including a vertical profile of a storm without hardware updates to existing displays. This may be especially true in case of current generation single-aisle aircraft where there is no dedicated vertical situation display (VSD). Providing all of the relevant information at a glance can enhance the situational awareness of the flight crew and may have a potential to improve safety.

Figure 6:
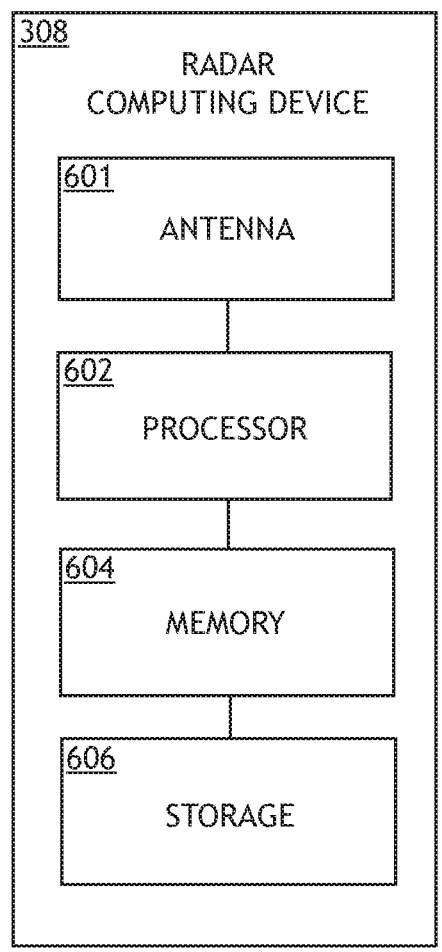
FIG. 6 is a view of an exemplary embodiment of an radar computing device of the system of FIG. 3 according to the inventive concepts disclosed herein.

Referring now to FIG. 1, an exemplary embodiment of an overhead view of a horizontal two-dimensional threat image 100 depicting threats 213A, 213B is shown. For example, the threats 213A, 213B may be weather threats, such as storm cells; however, in some embodiments, the horizontal two-dimensional threat image 100 may depict any type of threats, such as air traffic or other objects detectable by radar. For example, the horizontal two-dimensional threat image 100 may be generated by at least one processor 602 of a radar computing device 308, as shown in FIG. 6.

Figure 2:
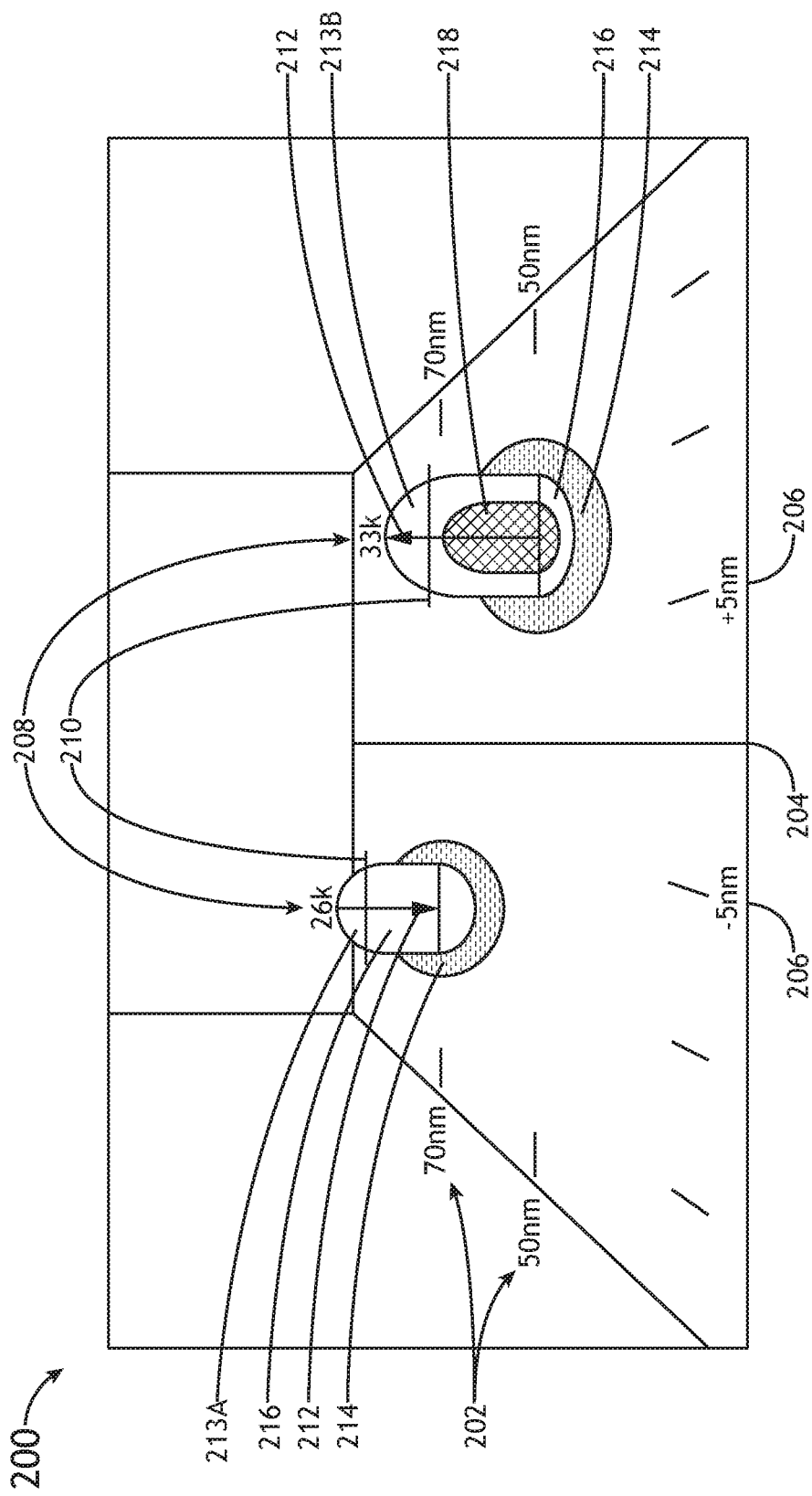
FIG. 2 is a view of an exemplary embodiment of three-dimensional threat image 200 according to the inventive concepts disclosed herein.
Figure 3:
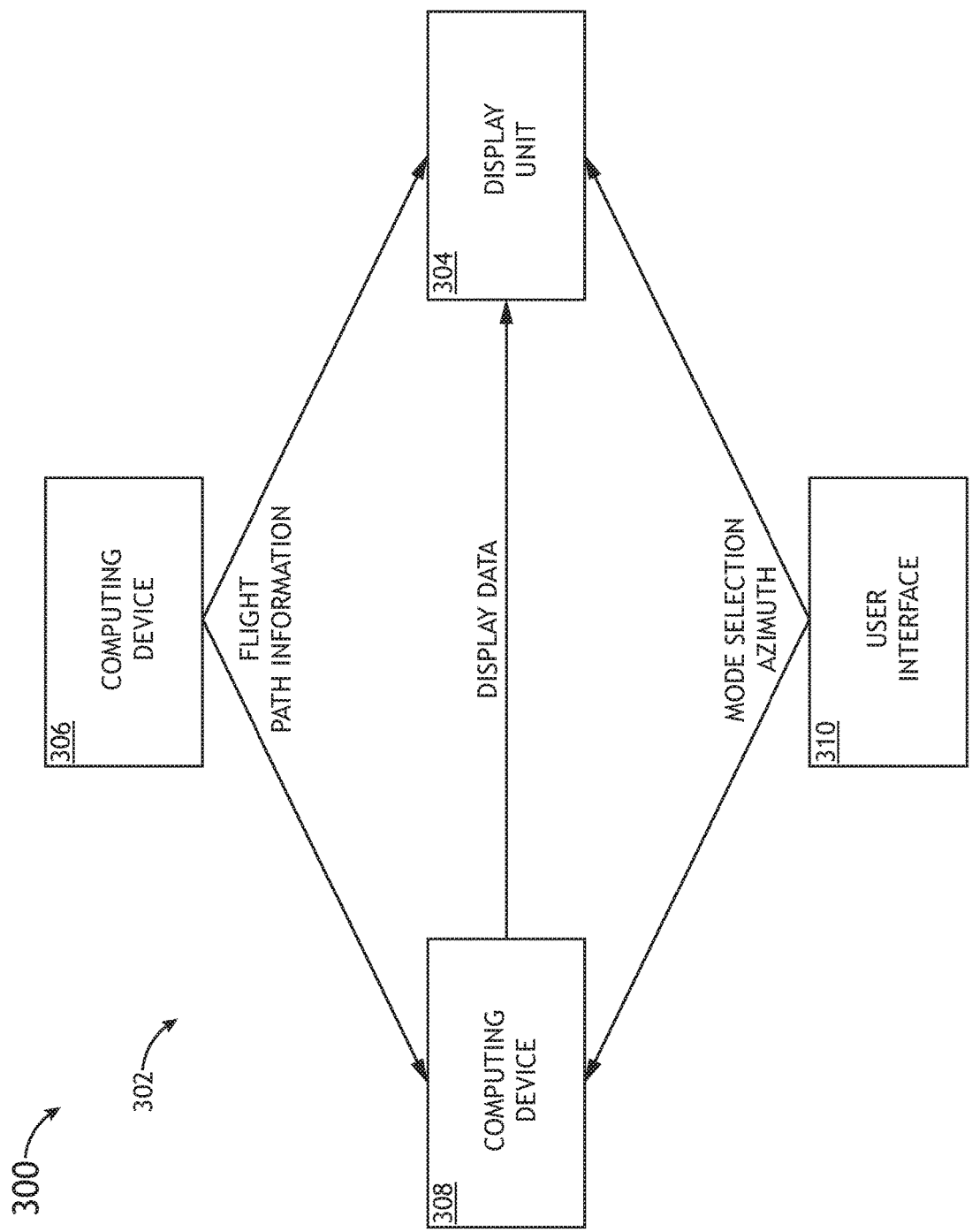
FIG. 3 is a view of an exemplary embodiment of a system according to the inventive concepts disclosed herein.
Figure 4:
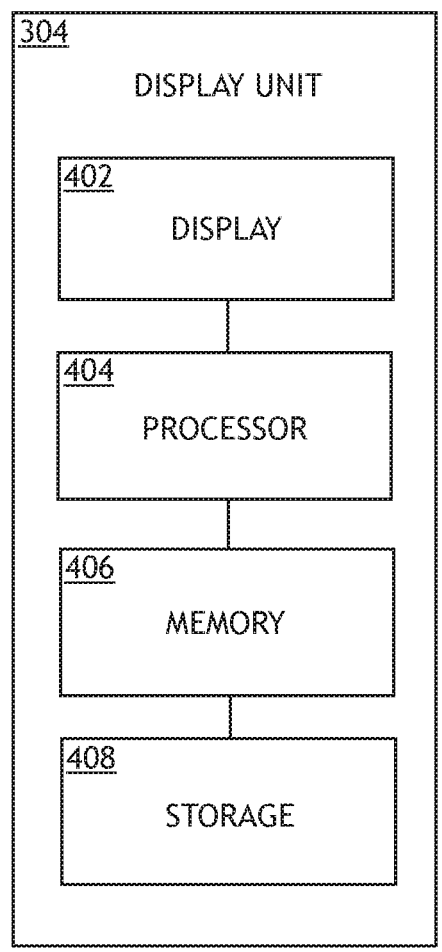
FIG. 4 is a view of an exemplary embodiment of a display unit computing device of the system of FIG. 3 according to the inventive concepts disclosed herein.

Referring now to FIG. 2, an exemplary embodiment of a view of a three-dimensional threat image 200 depicting the threats 213A, 213B is shown. For example, the threats 213A, 213B may be weather threats, such as storm cells; however, in some embodiments, the three-dimensional threat image 200 may depict any type of threats, such as air traffic or other objects detectable by radar. For example, the at least one threat 213A, 213B may be at least one storm threat, the radar data may be weather radar data, and the three-dimensional threat image 200 may be a three-dimensional storm threat image, as shown in FIG. 2. For example, the three-dimensional threat image 200 may be generated by at least one processor 602 of a radar computing device 308, as shown in FIG. 6. In some embodiments, the three-dimensional threat image 200 may be generated based at least in part on the horizontal two-dimensional threat image 100 and/or radar data. For example, the three-dimensional threat image 200 may be displayed by a display 402, as shown in FIG. 4.

For example, the three-dimensional threat image 200 may depict a three-dimensional relationship between an aircraft 302 and the at least one threat 213A, 213B. The three-dimensional threat image 200 may convey a range dimension, a lateral dimension extended perpendicularly from an azimuth 204 (e.g., from both sides of the azimuth 204), and a height dimension.

The three-dimensional threat image 200 may include: a graphical depiction of a height and width of each of the at least one threat 213A, 213B; a graphical depiction of an aircraft intercept altitude 210 for the aircraft 302 at each of the at least one threat 213A, 213B; a textual depiction of a threat height 208 (e.g., a storm top height) for each of the at least one threat 213A, 213B; a growth or decay indicator 212 (e.g., an upward pointing arrow for a growth indicator or a downward pointing arrow for a decay indicator) for each of the at least one threat 213A, 2136 to indicate whether the threat 213A, 213B is growing or decaying; a graphical depiction of severity regions (e.g., a first severity region 214, a second severity region 216, and/or a third severity region 218) for each of the at least one threat 213A, 213B, each severity region associated with a different predetermined range of severity levels (e.g., ranges of wind speed levels, ranges of density of lightning strike occurrence levels, and/or ranges of turbulence levels) and depicted differently (e.g., different colors, such as green, yellow, and red); a depiction of range indicators 202 for the range dimension and lateral distance indicators 206 for the lateral dimension; and/or a depiction of the azimuth 204.

In some embodiments, a graphical depiction of each of the at least one threat 213A, 213B may include a horizontal two-dimensional planar portion and a vertical two-dimensional planar portion extending perpendicularly from the horizontal two-dimensional planar portion so as to reduce processing requirements as compared to a three-dimensionally rendered representation of surface contours for each of the at least one threat 213A, 213B.

As exemplarily shown, the three-dimensional threat image 200 has a lateral dimension of 40 nautical miles (nm) (e.g., 20 nm from each side of the aircraft 302) with a range of 100 nm and with a height of at least 33,000 feet; however, any suitable dimensions may be used. In some embodiments, a user and/or at least one processor of the system may be configured to set and/or adjust the dimensions.

Referring now to FIGS. 3-6, an exemplary embodiment of a system 300 according to the inventive concepts disclosed herein is depicted. In some embodiments, the system may include an aircraft 302, which may include at least one user (e.g., flight crew and/or pilot(s)), at least one display unit computing device 304, at least one aircraft computing device 306, at least one radar computing device 308, and/or at least one user interface 310, some or all of which may be communicatively coupled at any given time. In some embodiments, the at least one display unit computing device 304, the at least one aircraft computing device 306, the at least one radar computing device 308, and/or the at least one user interface 310 may be implemented as a single computing device or any number of computing devices configured to perform (e.g., collectively perform if more than one computing device) any or all of the operations disclosed throughout. The at least one display unit computing device 304, the at least one aircraft computing device 306, the at least one radar computing device 308, and/or the at least one user interface 310 may be installed in the aircraft 302.

The user may be a pilot or crew member. The user may interface with the system 300 via the at least one user interface 310. The at least one user interface 310 may be implemented as any suitable user interface, such as a touchscreen (e.g., of the display unit computing device 304 and/or another display unit), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface 310 may be configured to receive at least one user input and to output the at least one user input to a computing device (e.g., 304, 306, and/or 308). For example, a pilot of the aircraft 104 may be able to interface with the user interface 310 to: select an azimuth to be used for an azimuth value; engage (or disengage) a mode (e.g., a "comprehensive display mode") to cause the three-dimensional threat image 200 to be displayed; command an azimuth mode to be based on at least one of a track of the aircraft 302, a pilot selected azimuth, and/or aircraft information from the aircraft computing device 306 (e.g., a flight management system (FMS) or flight data computer). For example, such user inputs may be output to the radar computing device 308 and/or the display unit computing device 304.

The display unit computing device 304 may be implemented as any suitable computing device, such as a primary flight display (PFD) computing device and/or a multi-function window (MFW) display computing device. As shown in FIG. 4, the display unit computing device 304 may include at least one display 402, at least one processor 404, at least one memory 406, and/or at least one storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications (e.g., a PFD application and/or an MFW application) or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the processor 404 may be configured to: receive the aircraft data from the at least one aircraft computing device processor 502; and/or overlay the three-dimensional threat image 200 over other information from the aircraft data or to overlay the other information from the aircraft data over the three-dimensional threat image 200. The display 402 may be configured to display the three-dimensional threat image 200 to a user.

Figure 5:
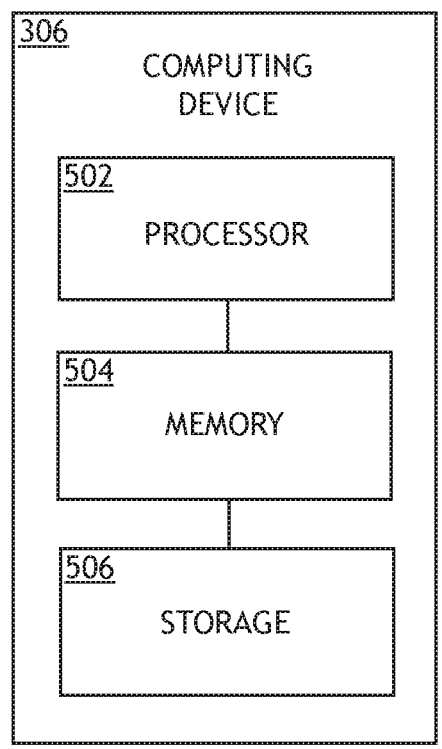
FIG. 5 is a view of an exemplary embodiment of an aircraft computing device of the system of FIG. 3 according to the inventive concepts disclosed herein.

The at least one aircraft computing device 306 may be implemented as any suitable computing device, such as an FMS computing device or a flight data computer. The at least one aircraft computing device 306 may include any or all of the elements, as shown in FIG. 5. For example, the aircraft computing device 306 may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., an FMS application) or computer code stored (e.g., maintained) in a non-transitory computer-readable medium (e.g., memory 504 and/or storage 506) and configured to execute various instructions or operations. The processor 502 of the aircraft computing device 306 may be configured to perform any or all of the operations disclosed throughout. For example, the processor 502 of the computing device 210A may be configured to: output aircraft data (e.g., FMS data, flight path data, inertial reference unit (IRU) data, flight data, and/or flight computer data) to the display unit computing device 304 and/or the radar computing device 308.

The at least one radar computing device 308 may be implemented as any suitable computing device, such as a weather radar computing device. The at least one radar computing device 308 may include any or all of the elements shown in FIG. 6. For example, the radar computing device 308 may include at least one radar antenna 601, at least one processor 602, at least one memory 604, and/or at least one storage 606, some or all of which may be communicatively coupled at any given time. For example, the at least one processor 602 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 602 may include a CPU and a GPU configured to perform (e.g., collectively perform) any of the operations disclosed throughout. The processor 602 may be configured to run various software applications (e.g., a radar application) or computer code stored (e.g., maintained) in a non-transitory computer-readable medium (e.g., memory 604 and/or storage 606) and configured to execute various instructions or operations. The processor 602 of the radar computing device 308 may be configured to perform any or all of the operations disclosed throughout. For example, the processor 602 may be configured to: obtain the aircraft data from the at least one aircraft computing device processor 502; obtain the azimuth value associated with the azimuth 204; obtain the radar data associated with the at least one threat 213A, 213B; generate the three-dimensional threat image 200 based at least on the aircraft data, the azimuth value, and the radar data; output the three-dimensional threat image 200 as the graphical data to the at least one display unit computing device processor 404; use the aircraft data to accurately compute weather information to be displayed; and/or based at least on a mode and/or azimuth user input (e.g., from the user interface 310 and/or a processor of the system 300), compute dimensions for the three-dimensional threat image 200 to be displayed.

For example, at least one processor (e.g., the at least one processor 404, the at least one processor 502, and/or the at least one processor 602) may be configured to (e.g., collectively configured to, if more than one processor): obtain aircraft data associated with the aircraft 302; obtain an azimuth value associated with an azimuth 204; obtain radar data associated with at least one threat 213A, 2136; generate a three-dimensional threat image 200 based at least on the aircraft data, the azimuth value, and/or the radar data; and/or output the three-dimensional threat image 200 as graphical data.

At least one processor (e.g., the at least one processor 404, the at least one processor 502, and/or the at least one processor 602) of the aircraft 302 may be configured to perform (e.g., collectively perform) any or all of the operations disclosed throughout.

Figure 7:
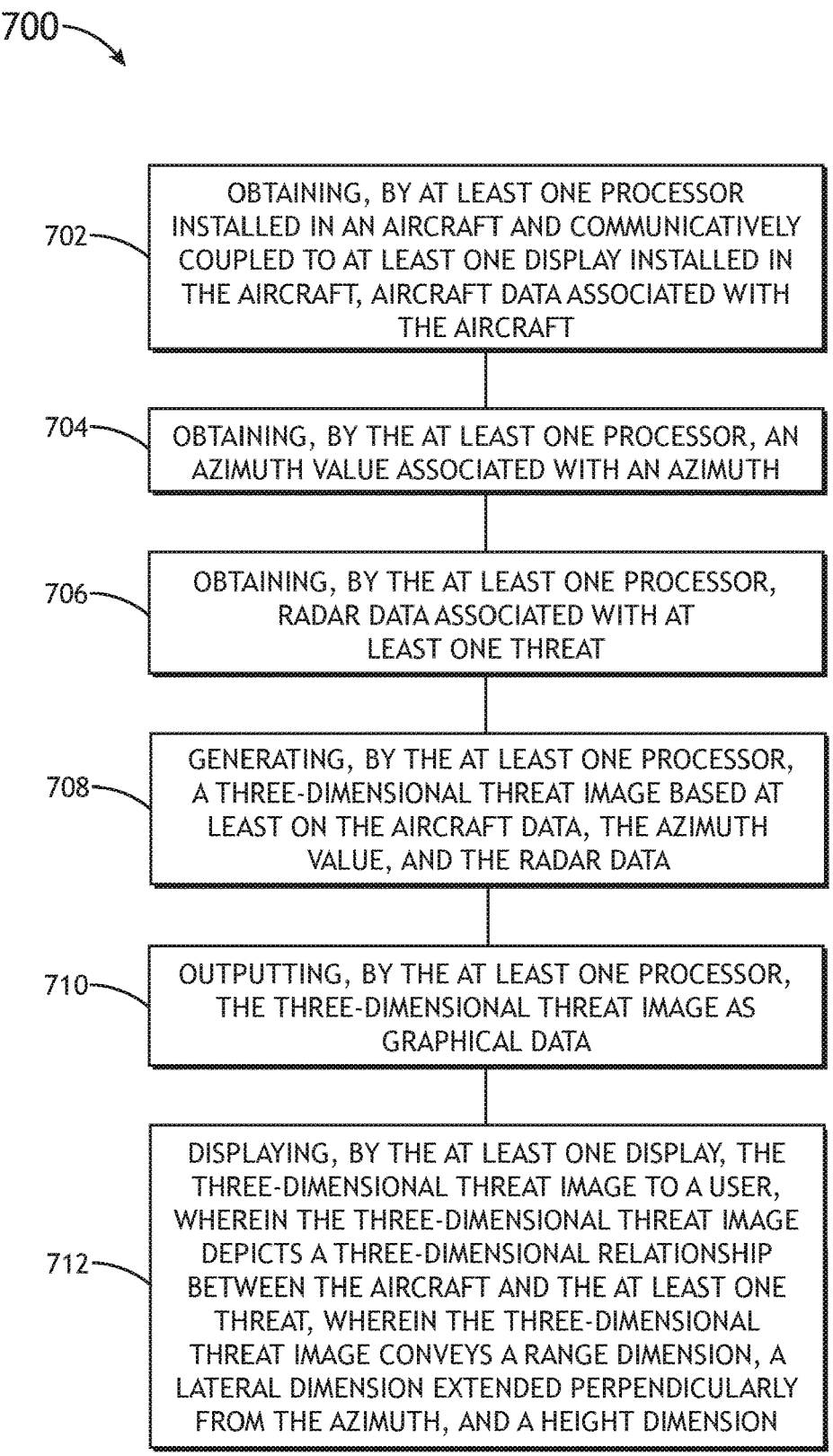
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include obtaining, by at least one processor installed in an aircraft and communicatively coupled to at least one display installed in the aircraft, aircraft data associated with the aircraft.

A step 704 may include obtaining, by the at least one processor, an azimuth value associated with an azimuth.

A step 706 may include obtaining, by the at least one processor, radar data associated with at least one threat.

A step 708 may include generating, by the at least one processor, a three-dimensional threat image based at least on the aircraft data, the azimuth value, and the radar data.

A step 710 may include outputting, by the at least one processor, the three-dimensional threat image as graphical data.

A step 712 may include displaying, by the at least one display, the three-dimensional threat image to a user, wherein the three-dimensional threat image depicts a three-dimensional relationship between the aircraft and the at least one threat, wherein the three-dimensional threat image conveys a range dimension, a lateral dimension extended perpendicularly from the azimuth, and a height dimension.

Further, the method 700 may include any of the operations disclosed throughout.

As will be appreciated from the above, embodiments of the inventive concepts disclosed herein may be directed to a system (e.g., an aircraft system) and a method configured to display at least one three-dimensional threat image.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    at least one display installed in an aircraft; and
    at least one processor installed in the aircraft and communicatively coupled to the at least one display, the at least one processor configured to:
        obtain aircraft data associated with the aircraft;
        obtain an azimuth value associated with an azimuth;
        obtain radar data associated with at least one threat;
        generate a three-dimensional threat image based at least on the aircraft data, the azimuth value, and the radar data; and
        output the three-dimensional threat image as graphical data;
    wherein the at least one display is configured to display the three-dimensional threat image to a user;
    wherein the three-dimensional threat image depicts a three-dimensional relationship between the aircraft and the at least one threat, wherein the three-dimensional threat image conveys a range dimension, a lateral dimension extended perpendicularly from the azimuth, and a height dimension;
    wherein the at least one threat is at least one storm threat, wherein the radar data is weather radar data, wherein the three-dimensional threat image is a three-dimensional storm threat image;
    wherein the three-dimensional storm threat image further comprises a growth or decay indicator for each of the at least one storm threat, each growth or decay indicator indicative of a growth or a decay of a particular storm associated with a particular storm threat.

2. The system of claim 1, wherein the three-dimensional threat image comprises a graphical depiction of a horizontal two-dimensional planar portion and a vertical two-dimensional planar portion extending perpendicularly from the horizontal two-dimensional planar portion for each of the at least one threat so as to reduce processing requirements as compared to a three-dimensionally rendered representation of surface contours for each of the at least one threat.

3. The system of claim 2, wherein the three-dimensional threat image further comprises a graphical depiction of an aircraft intercept altitude for the aircraft at each of the at least one threat.

4. The system of claim 3, wherein the three-dimensional threat image further comprises a textual depiction of a threat height for each of the at least one threat, each threat height corresponding to a storm top height.

5. The system of claim 4, wherein the three-dimensional threat image further comprises a graphical depiction of a first severity region and a second severity region for each of the at least one threat, the first severity region associated with a first predetermined range of severity levels, the second severity region associated with a second predetermined range of severity levels, the first severity region being depicted differently from the second severity region.

6. The system of claim 5, wherein the three-dimensional threat image further comprises a depiction of range indicators for the range dimension and lateral distance indicators for the lateral dimension.

7. The system of claim 6, wherein the three-dimensional threat image further comprises a depiction of the azimuth.

8. The system of claim 1, wherein the azimuth value is based on at least one of a track of the aircraft, a user input of a selected azimuth, or the aircraft data.

9. The system of claim 1, wherein the at least one processor comprises at least one aircraft computing device processor, at least one display unit computing device processor, and at least one radar computing device processor, the at least one aircraft computing device processor, the at least one display unit computing device processor, and the at least one radar computing device processor being communicatively coupled, wherein the at least one radar computing device processor is configured to: obtain the aircraft data from the at least one aircraft computing device processor; obtain the azimuth value associated with the azimuth; obtain the radar data associated with the at least one threat; generate the three-dimensional threat image based at least on the aircraft data, the azimuth value, and the radar data; and output the three-dimensional threat image as the graphical data to the at least one display unit computing device processor.

10. The system of claim 9, wherein the at least one display unit computing device processor is configured to receive the aircraft data from the at least one aircraft computing device processor.

11. The system of claim 10, wherein the at least one display unit computing device processor is further configured to overlay the three-dimensional threat image over other information from the aircraft data or to overlay the other information from the aircraft data over the three-dimensional threat image.

12. A method, comprising:
    obtaining, by at least one processor installed in an aircraft and communicatively coupled to at least one display installed in the aircraft, aircraft data associated with the aircraft;
    obtaining, by the at least one processor, an azimuth value associated with an azimuth;
    obtaining, by the at least one processor, radar data associated with at least one threat;
    generating, by the at least one processor, a three-dimensional threat image based at least on the aircraft data, the azimuth value, and the radar data;
    outputting, by the at least one processor, the three-dimensional threat image as graphical data; and
    displaying, by the at least one display, the three-dimensional threat image to a user;
    wherein the three-dimensional threat image depicts a three-dimensional relationship between the aircraft and the at least one threat, wherein the three-dimensional threat image conveys a range dimension, a lateral dimension extended perpendicularly from the azimuth, and a height dimension;
    wherein the at least one threat is at least one storm threat, wherein the radar data is weather radar data, wherein the three-dimensional threat image is a three-dimensional storm threat image;
    wherein the three-dimensional storm threat image further comprises a growth or decay indicator for each of the at least one storm threat, each growth or decay indicator indicative of a growth or a decay of a particular storm associated with a particular storm threat.

* * * * *